United States Patent [19]
Fassler et al.

[11] Patent Number: 5,764,429
[45] Date of Patent: Jun. 9, 1998

[54] MAGNETIC WRITING OF REPETITIVE INFORMATION ON MAGNETIC WHEEL AND MAGNIZATION HEAD FOR MEDIA

[75] Inventors: Werner N. Fassler; Svetlana Reznik, both of Rochester; James E. Pickering, Holcomb; J. Kelly Lee, Rochester, all of N.Y.

[73] Assignee: Eastman Kodak Company, Rochester, N.Y.

[21] Appl. No.: 639,491

[22] Filed: Apr. 29, 1996

[51] Int. Cl.$^6$ ...................................................... G11B 5/09
[52] U.S. Cl. ......................... 360/55; 346/74.7; 235/493
[58] Field of Search ................................. 101/489, 212; 360/41, 100.1, 136; 428/336; 235/493; 346/74.7; 180/65.6; 340/319; 342/428; 400/124.07

[56] References Cited

U.S. PATENT DOCUMENTS

| | | | |
|---|---|---|---|
| 3,085,246 | 4/1963 | Cowden | 360/41 |
| 3,623,120 | 11/1971 | Lichowsky | 360/136 |
| 4,372,696 | 2/1983 | Pou | 400/124.07 |
| 4,449,130 | 5/1984 | Magnenet | 346/74.7 |
| 4,463,676 | 8/1984 | Harada et al. | 101/212 |
| 5,218,493 | 6/1993 | Jeffers | 360/100.1 |
| 5,234,762 | 8/1993 | Palone | 428/336 |

FOREIGN PATENT DOCUMENTS

| | | |
|---|---|---|
| 601939 A2 | 6/1994 | European Pat. Off. . |
| 2839046 | 3/1979 | Germany . |
| 63-313321 | 6/1987 | Japan . |

*Primary Examiner*—Nabil Hindi
*Assistant Examiner*—Patrick Wamsley
*Attorney, Agent, or Firm*—James D. Leimbach

[57] ABSTRACT

A method and apparatus for recording on magnetic media which comprises a magnetic wheel made from a magnetic material, that is essentially an isotropic material such as NdFeB (neodymium iron boron) material having an energy product on the order of 7.1 MGOe. The magnetic wheel is operatively connected to a drive motor by juxtapositioning a magnetization write head having a gap that produces the desired flux pattern in response to the electrical input to a coil within the head, encoded magnetic information is placed on the wheel. The magnetized wheel can than be used to record encoded data upon preselected media, such as metered paper for a thermal printer.

7 Claims, 3 Drawing Sheets

MAGNETIC WRITING OF REPETITIVE INFORMATION ON MAGNETIC WHEEL AND MAGNIZATION HEAD FOR MEDIA

FIELD OF INVENTION

The invention relates generally to the field of magnetic recording, and in particular to continuously writing repetitive data onto moving magnetic media.

BACKGROUND OF THE INVENTION

Magnetic heads used within magnetic recording vehicles are very time-base demanding. The recording of repetitive data in magnetic media manufacturing on the back, front, or sides of media, donor, film or other carrier media, presents substantial problems that are amplified at higher speeds. In manufacturing environments requiring high speed or large quantities, these problems translate into a need for accurate velocity control of all media during the manufacturing process.

The magnetic head will also be subject to wear contamination, fracturing, gap decay, and many more decay, and wear problems that reduce the robustness of the magnetic head. Furthermore, there are factors that can not be ignored such as wear, scratching and dirt build upon the media. This invention describes a technique to avoid such speed control and robustness limitations in media manufacturing.

SUMMARY OF THE INVENTION

The present invention is directed to overcoming one or more of the problems set forth above. A permanent magnetic wheel is fabricated and magnetized (recorded) with a magnetic fixture. One way of the recording is a capacitive discharge type magnetizer used to magnetize the magnetic wheel. The magnetic material is isotropic bonded NdFeB (neodymium iron boron) material with energy product of 7.1 MGOe. This magnetized wheel is used for writing repetitive information on media. In other words the flux reversals from the permanent magnet in contact with the media transfers the repetitive data on to the media. The transfer occurs when the magnet is in contact with magnetic coating. The high energy magnetic properties of the wheel are used to magnetize the media.

A second technique is the magnetic wheel is moving at a constant velocity and an amplified sinus transcendental signal of chosen frequency writes the correct flux reversal sequence to the permanent magnetic wheel. This magnetized wheel is used in media manufacturing as described previously. An extra signal transfer station can also be constructed for the data transfer.

The physical size of the wheel depends upon the overall function for which it is intended to be used as well as the media type that will be employed. When the signal is used for metering, of paper for example, any number of wheel diameters are conceivable depending on the specific metering function. If the signal is an information sequence the diameter has to be sufficient to contain the information on its periphery. In other words the information quantity and write density are the determining factors for the magnetized wheel diameter.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The net gain is in media manufacturing a simple magnetic wheel used to record position and/or data information on various types of magnetically coated media.

BRIEF DESCRIPTION OF THE DRAWINGS

FIG. 2b is a front view of the wheel of FIG. 2a;

DETAILED DESCRIPTION OF THE INVENTION

We have discovered that a permanent magnetic wheel can be fabricated and magnetized (recorded) with a magnetic fixture. One way of the recording is a capacitive discharge type magnetizer used to magnetize the magnetic wheel. The magnetic material is isotropic bonded NdFeB (neodymium iron boron) material. The preferred embodiment envisions an energy product of about 7.1 MGOe. This magnetized wheel is used for writing repetitive information on media. In other words the flux reversals from the permanent magnet in contact with the media transfers the repetitive data on to the media. The transfer occurs when the magnet is in contact with magnetic coating. The high energy magnetic properties of the wheel are used to magnetize the media.

A second technique is the magnetic wheel is moving at a constant velocity and an amplified sinus transcendental signal of chosen frequency writes the correct flux reversal sequence to the permanent magnetic wheel. This magnetized wheel is used in media manufacturing as described previously. An extra signal transfer station can also be constructed for the data transfer.

Figure 1:
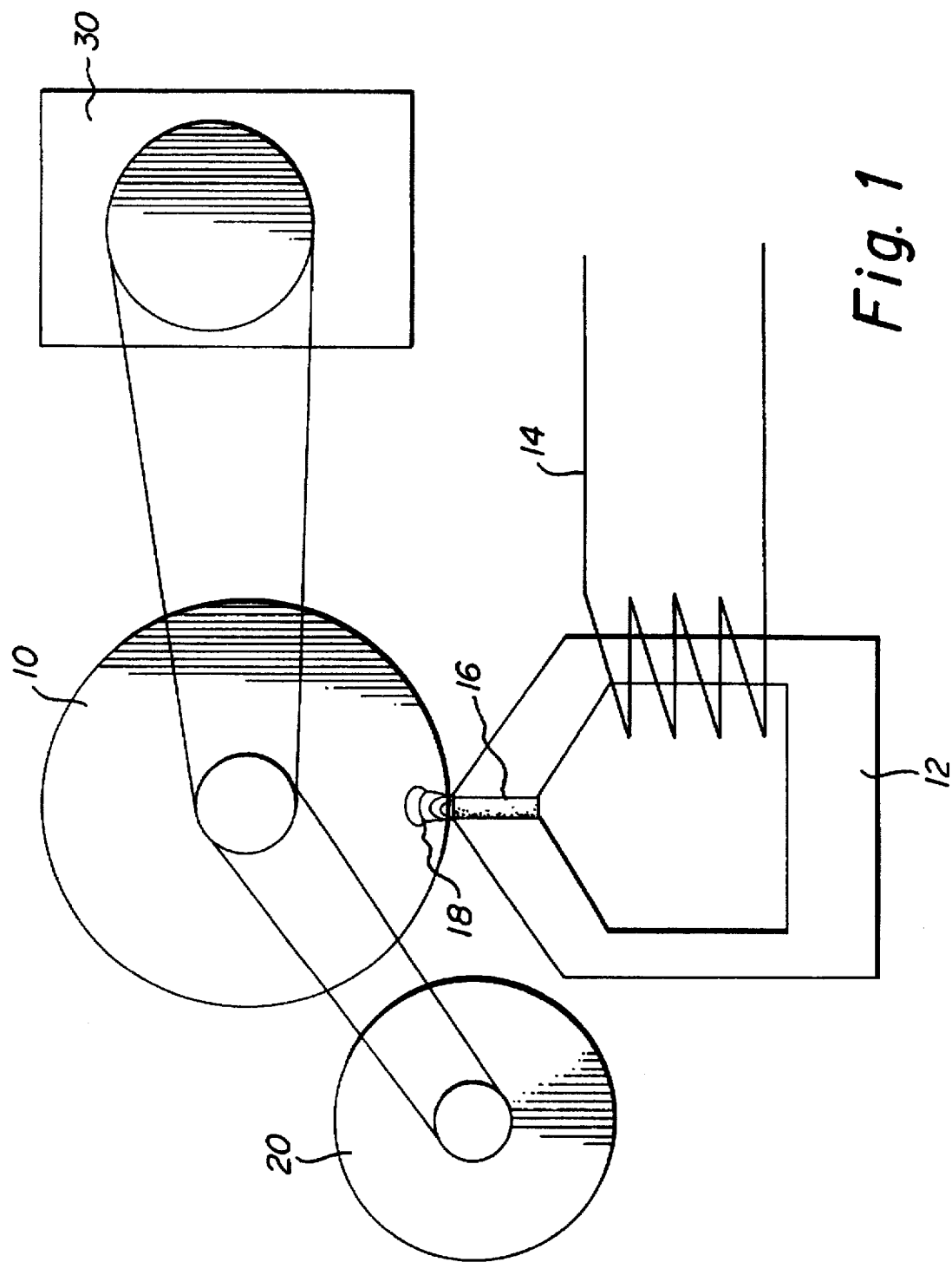
FIG. 1 is simplified schematic of the magnetic recording techniques of the present invention.

Referring now to FIG. 1 a simplified schematic of our magnetic recording technique that illustrates the placing of one pulse on a permanent magnetic wheel, generally referred to as 10, which is fabricated and magnetized (recorded) with a magnetic fixture as described in U.S. patent application Ser. No. 08/370,720, filed Jan. 10, 1995, for Very High Field Micro Roller and Method of Making Same, which is commonly assigned with the present invention. Magnetization head 12 magnetically writes encoded data on permanent magnetic wheel 10 by having coil 14 excited with discharge or a sine wave create the flux lines 18 within gap 16 to be applied to wheel 10. Drive motor 20 controls the rotation of wheel 10 as head 12 writes the encoded data, thereon. Encoder 30 supplies position readout for signal processing, and details where a shaft is located at any given time.

Figure 2A:
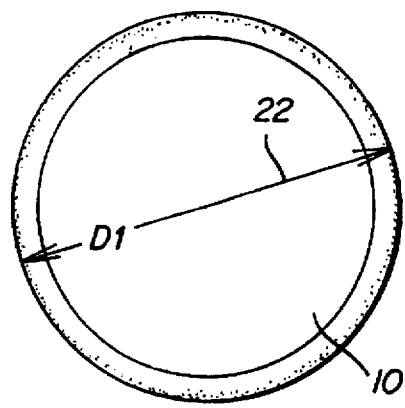
FIG. 2a is a side view of a permanent magnet wheel of the present invention.
Figure 2B:
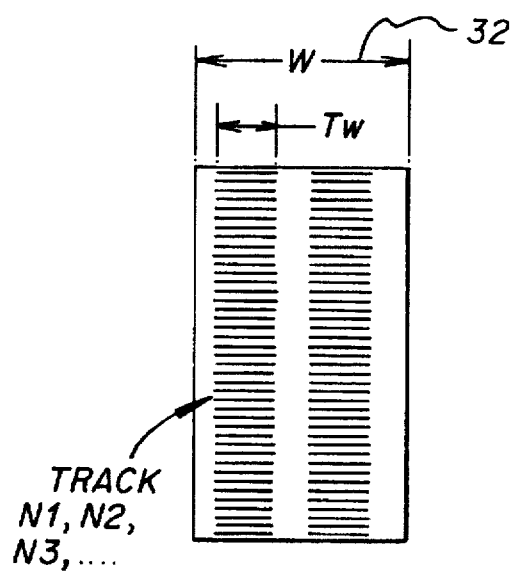

Referring now to FIG. 2a which is a side view of a permanent magnet wheel 10 has a diameter 22 (indicated as D1) that is suitable for the selected mechanical function and the length of the digital sentence that is to be written on the chosen media. FIG. 2b is a front view of the wheel 10 in FIG. 2a. Here, the selected wheel width 32 (indicated as W) that is also selected by employing mechanical considerations related to the specific use that the present invention is being used within. As indicated in FIG. 2b, the track width (indicated as $T_w$) is selected for suitable mechanical and mechanical function related to the specific purpose that the device of the present invention is being placed in. The parameters for track width are selected to read information with inductive or resistive magnetic heads. The overall function to which the present invention is to be employed will also dictate the number of tracks (indicated as N1, N2, N3 . . . ) needed for a specific application.

Figure 3:
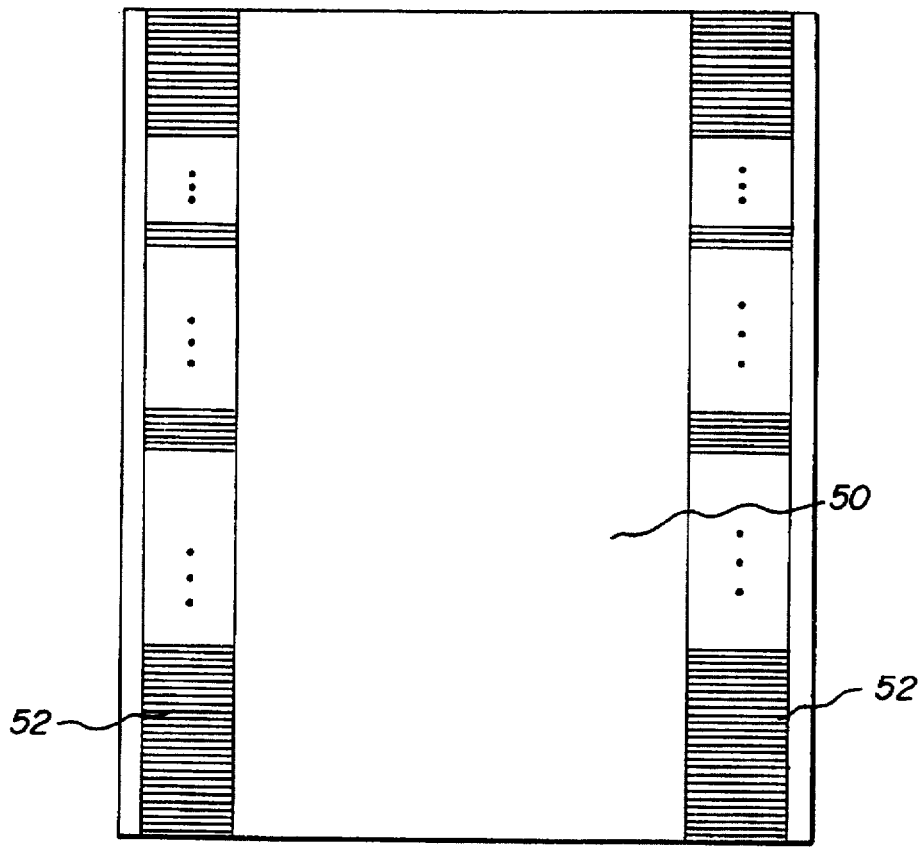
FIG. 3 is a diagram of the media used in the preferred embodiment.

FIG. 3 is a diagram of the media used in the preferred embodiment of the present invention, wherein metering of paper is the desired function of the present invention. Referring to FIG. 3, paper 50 contains magnetic metered areas 52 that have been encoded with data that permits a thermal printer station to place the paper 50, remove it, and replace the paper 50 again. This is desirable because the thermal print station (not shown) requires several pass for multi-color printing. In this embodiment metered areas 52 are capable of encoding 300 lines/inch. The use of metered paper 50 is a significant improvement over paper registration techniques that employ non-metered paper.

The preferred embodiment uses a magnetic material such an isotropic material such as NdFeB (neodymium iron boron) material with energy product of 7.1 MGOe. This material results in magnetized wheel that can produce the maximum number of flux lines per inch. Currently, 300 lines per inch are envisioned. However, it is also envisioned that much greater flux densities are achievable. It is conceivable that other isotropic materials can be used, however, the NdFeB presently produces the maximum number of flux lines per inch.

The magnetic wheel produced can be used for the accurate recording of information on media. Typically, this information is repeated creating exact copies on additional pieces of media. The permanent magnet is use to accurately, repetitively reproduce a data stream. The data stream can then be used for metering information or data storage. Such recording is especially useful in manufacturing process where one utilizes, for example coating machines. Notoriously these machines have hesitation problems. Each recording has the flux reversals from the permanent magnet contained on the magnetic wheel placed in contact with the media to transfer the data on to the media (when the magnet is in contact with magnetic coating) to compensate for jitters and other fluctuations. The high energy magnetic properties of the wheel are used to magnetize the media.

A second technique is the magnetic wheel is moving at a constant velocity and an amplified sinus transcendental signal of chosen frequency writes the correct flux reversal sequence to the permanent magnetic wheel. This magnetized wheel is used in media manufacturing as described previously. An extra signal transfer station can also be constructed for the data transfer.

When the signal is used for the metering any number of wheel diameters can conceivably be used. If the signal is an information sequence, the diameter has to be sufficient to contain the information on its periphery. In other words the information quantity and write density are the determining factors for the magnetized wheel diameter.

Figure 4:
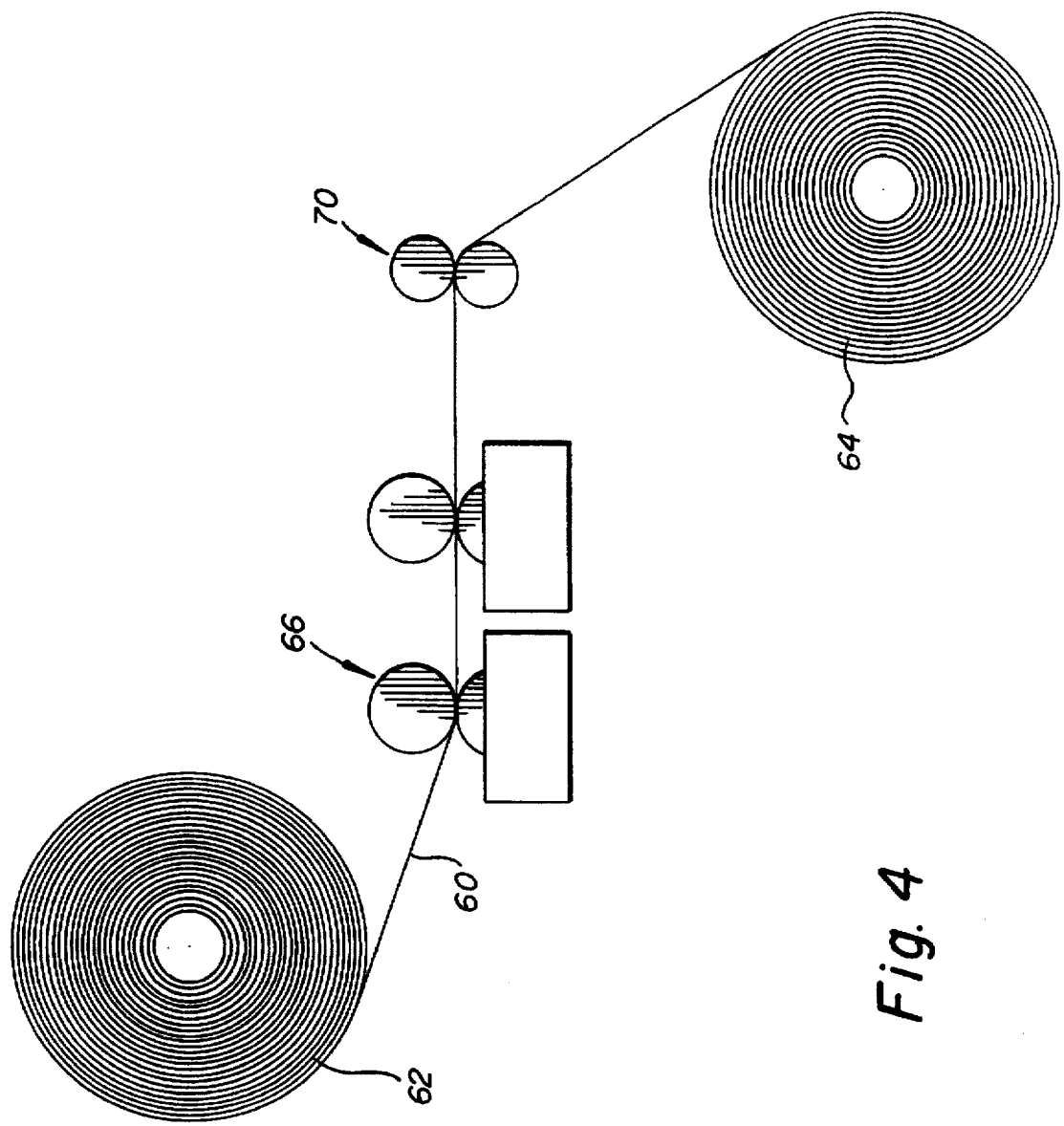
FIG. 4 is a simplified schematic of the use of our magnetic writing wheel in a typical manufacturing process.

FIG. 4 is a simplified schematic of the use our magnetic writing wheel in a typical manufacturing process. Media 60 between supply roll 62 and take up roll 64 encountering coatings, for example a thermal receiver with plasticizer, lubricating coating etc., with at least one of the coating stations putting down the magnetic material required by the invention. The permanent magnetic wheel 70 supplies tracking information on the media 60 prior to the media 60 reaching the take up wheel. The embodiment of FIG. 4 has advantages over conventional techniques. The tracking wheel compensates for the machine velocity changes, can track up and down motion, does not require the energy supply required by a conventional magnetic head and results in a robust manufacturing technique.

The invention has been described with reference to a preferred embodiment. However, it will be appreciated that variations and modifications can be effected by a person of ordinary skill in the art without departing from the scope of the invention.

Parts List:

10 wheel
12 head
14 coil
16 gap
18 flux lines
20 drive motor
22 diameter
30 encoder
32 wheel width
50 paper
52 metered areas
60 media
62 supply roll
64 take up roll
70 magnetic wheel

We claim:

1. A system for recording on magnetic printing media comprising:

a magnetic wheel made from a magnetic material;

a drive motor operatively connected to the wheel;

a magnetization head having a gap juxtaposed to the wheel to write encoded magnetic information on the wheel;

a coil within the head to generate flux within the gap from the coil which is electrically connected to a circuit that generates a sine wave having predetermined features;

a magnetic media having a magnetizable coating on at least one surface to receive from the magnetic wheel encoded magnetic information;

wherein the wheel is used to repeatably write positional or other information by transferring the information to the media in magnetic form.

2. The device of claim 1 wherein the magnetic material is an isotropic material such as NdFeB (neodymium iron boron).

3. The device in claim 2 wherein the isotropic magnetic material has an energy product of approximately 7.1 MGOe.

4. The invention of claim 1 wherein the gap generates less than 300 flux lines per inch on the magnetic wheel.

5. A method of placing encoded magnetic data on a magnetic medium comprising the steps of:

providing a magnetic wheel having a predetermined number of flux lines per inch of magnetization capability;

placing encoded data on the magnetic wheel in the form of magnetically recorded data;

providing medium having magnetized areas capable of receiving the encoded data on the magnetic wheel; and passing the medium across the magnetic wheel such that the magnetized areas pass over the magnetic wheel at a predetermined speed to magnetically record the magnetically recorded data onto the medium.

6. The method of claim 5 wherein the step of providing the magnetic wheel further comprises providing a magnetic wheel that employs a magnetic material that is an isotropic material such as NdFeB (neodymium iron boron).

7. The method of claim 6 wherein the step of providing further comprises providing an isotropic magnetic material that has an energy product of 7.1 MGOe on the magnetic wheel.

* * * * *